(12) United States Patent
Legrand

(10) Patent No.: US 6,387,514 B1
(45) Date of Patent: May 14, 2002

(54) SOLAR CONTROL COATED SUBSTRATE WITH HIGH REFLECTANCE

(75) Inventor: Philippe Legrand, More (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 09/424,291

(22) PCT Filed: Mar. 17, 1999

(86) PCT No.: PCT/BE99/00035

§ 371 Date: Nov. 22, 1999

§ 102(e) Date: Nov. 22, 1999

(87) PCT Pub. No.: WO99/48827

PCT Pub. Date: Sep. 30, 1999

(30) Foreign Application Priority Data

Mar. 20, 1998 (GB) ............................................. 9806030

(51) Int. Cl.[7] ............................................. B32B 17/06
(52) U.S. Cl. ......................... 428/432; 65/17.1; 65/60.1
(58) Field of Search .................. 65/17.1, 60.1, 65/60.5, 60.51, 60.52; 428/432

(56) References Cited

U.S. PATENT DOCUMENTS

| | | | | |
|---|---|---|---|---|
| 3,984,591 A | * | 10/1976 | Plumat et al. .............. | 427/165 |
| 4,900,634 A | * | 2/1990 | Terneu et al. ................ | 428/432 |
| 5,203,903 A | * | 4/1993 | Terneu et al. ................ | 65/60.2 |
| 5,256,485 A | * | 10/1993 | Terneu et al. ................ | 428/426 |
| 5,721,054 A | * | 2/1998 | Vandiest et al. ............. | 428/428 |
| 6,110,597 A | * | 8/2000 | Fujisawa et al. ............. | 428/432 |
| 6,124,026 A | * | 9/2000 | McCurdy et al. ............ | 428/216 |

FOREIGN PATENT DOCUMENTS

| | | |
|---|---|---|
| GB | 2302101 A | 1/1997 |
| GB | 2302102 A | 1/1997 |
| WO | 97/25287 | 7/1997 |

* cited by examiner

*Primary Examiner*—Deborah Jones
*Assistant Examiner*—Gwendolyn Blackwell
(74) *Attorney, Agent, or Firm*—Piper Marbury Rudnick & Wolfe LLP; Jerold I. Schneider

(57) ABSTRACT

A solar control coated substrate with high reflectance (RL) and comprises a pyrolytically-formed coating layer containing oxides of tin and antimony in a Sb/Sn molar ratio of from 0.03 to 0.16, characterized in that the coating layer further contains additives comprising at least one element selected form the group consisting of aluminum, chromium, cobalt, iron, manganese, magnesium, nickel, vanadium, zinc, and zirconium and is free from fluorine, whereby the so coated substrate has a reflectance of at least 10%. The invention covers a process for making such a coated substrate and a glazing panel incorporating such a coated substrate.

39 Claims, No Drawings

SOLAR CONTROL COATED SUBSTRATE WITH HIGH REFLECTANCE

BACKGROUND OF THE INVENTION

1. Field of the Invention

The present invention relates to a solar control coated substrate with high-reflectance and to a process for making such a coated substrate.

2. Description of the Related Art

Transparent solar control panels have become much in demand for use as exterior glazing for buildings. In addition to having aesthetic appeal they offer advantages in providing protection against solar radiation and its dazzling effects, giving occupants of the building a screen against overheating and glare.

The panels comprise at least one sheet of a transparent substrate material, typically soda-lime glass, carrying a coating to provide the specific properties required. The solar control requirement is that the panel shall not pass too great a proportion of total incident solar radiation, thereby resisting overheating of the building interior. The transmission of total incident solar radiation may be expressed in terms of the "solar factor" (FS). As used herein, the term "solar factor" means the sum of the total energy directly transmitted and the energy which is absorbed and re-radiated on the side away from the energy source, as a proportion of the total radiant energy incident on the coated substrate.

Although architects seeking glazing panels for use in buildings have traditionally tended to favour panels with low levels of reflection, a changing perception of the aesthetic appeal has led to increasing demands for panels with high levels of reflection, while retaining a low solar factor.

Properties of the coated substrate discussed herein are based on the standard definitions of the International Commission on Illumination—Commission Internationale de l'Eclairge ("CIE").

The "luminous transmittance" (TL) is the luminous flux transmitted through a substrate as a percentage of the Incident luminous flux.

The "luminous reflectance" (RL) is the luminous flux reflected from a substrate as a percentage of the incident luminous flux.

The "selectivity" of a coated substrate for use in a building glazing panel is the ratio of the luminous transmittance to the solar factor (TL/FS).

The "purity" (p) of the colour of the substrate refers to the excitation purity in transmission or reflection measured with Illuminant C. It is specified according to a linear scale on which a defined white light source has a purity of zero and the pure colour has a purity of 100%. Illuminant C represents average daylight having a colour temperature of 6700° K.

The term "refractive index" (n) is defined in the CIE International Lighting Vocabulary, 1987, page 138.

The "dominant wavelength" ($\lambda_D$) is the peak wavelength in the range transmitted or reflected by the coated substrate.

A number of techniques are known for forming coatings on a vitreous substrate, including pyrolysis. Pyrolysis generally has the advantage of producing a hard coating, precluding the need for a protective layer. The coatings formed by pyrolysis have durable abrasive- and corrosion-resistant properties. It is believed that this is due in particular to the fact the process involves deposition of coating material on to a substrate which is hot. Pyrolysis is also generally cheaper than alternative coating processes such as sputtering, particularly in terms of the investment in plant.

A wide variety of coating materials have been proposed for modifying the optical properties of glazing panels. Tin oxide ($SnO_2$) has been widely used, often in combination with other materials such as other metal oxides.

Our GB patent 1455148 teaches a method for pyrolytically forming a coating of one or more oxides (e.g. $ZrO_2$, $SnO_2$, $Sb_2O_3$, $TiO_2$, $CO_3O_4$, $Cr_2O_3$, $SiO_2$) on a substrate, primarily by spraying compounds of a metal or silicon, so as to modify the light transmission and/or light reflection of the substrate. Our GB patent 2078213, which relates to a method for pyrolytically forming a coating by two separate sprays to achieve high rates of coating build-up, discloses tin oxide coatings doped with fluorine or antimony. Our GB patent 2200139 relates to forming a pyrolytic tin oxide coating from a precursor containing at least two additives such as oxidising agents, sources of fluorine and sources of metal.

The use of a tin oxide coating with a small proportion of antimony oxide has been found to offer several advantageous combinations of optical properties. Our GB patent applications 2302101 ('101) and 2302102 ('102) describe anti-solar glazing panels comprising a pyrolytic coating layer of oxides of tin and antimony in which the Sb/Sn molar ratio is from 0.01 to 0.5. The '101 coating is applied by liquid spray and has a thickness of at least 400 nm, a luminous transmittance of less than 35% and a selectivity of at least 1.3. The '102 coating is applied by chemical vapour deposition (CVD) and has a solar factor below 70%.

It is an object of the present invention to provide a pyrolytically formed coated substrate which imparts solar screening properties and a high reflectance.

SUMMARY OF THE INVENTION

We have discovered that this and other useful objectives can be achieved by including certain defined additives when applying to a substrate a pyrolytic coating comprising tin and antimony oxides.

Thus, according to a first aspect of the present invention, there is provided a transparent substrate carrying a pyrolytically-formed coating layer containing oxides of tin and antimony in a Sb/Sn molar ratio of from 0.01 to 0.5, characterised in that the coating layer further contains an additive comprising one or more of aluminium, chromium, cobalt, iron, manganese, magnesium, nickel, vanadium, zinc and zirconium and is free from fluorine, whereby the so-coated substrate has a reflectance (RL) of at least 10%.

The invention further provides a method of forming a transparent coated substrate comprising the pyrolytic deposition from a reactant mixture onto the substrate of a coating layer containing tin oxide and antimony in a Sb/Sn molar ratio from 0.01 to 0.5, said reactant mixture comprising a source of tin and a source of antimony, characterised in that the reactant mixture further contains an additive comprising one or more of aluminium, chromium, cobalt, iron, manganese, magnesium, nickel, vanadium, zinc and zirconium and is free from fluorine, whereby the so-coated substrate has a reflectance (RL) of at least 10%.

DESCRIPTION OF THE PREFERRED EMBODIMENTS

It has been found that a coating of oxides of tin and antimony modified by an additive as described above (referred to herein as a "modified tin oxide/antimony coating") retains the anti-solar properties of the coating without the additive but also can display a much higher level of reflectance.

A coated substrate according to the invention may be employed as a single-sheet glazing panel or alternatively in a multiple glazed or laminated so panel assembly. In a multiple glazing or laminated assembly it is preferred that just one of the constituent sheets carries the coating.

Although the invention is described herein primarily with reference to glazing panels for buildings, panels according to the invention are suitable for other applications such as vehicle windows, in particular vehicle sunroofs.

Because coatings produced by pyrolysis generally have a greater mechanical resistance than coatings produced by other methods the choice of location of the coating can be made according to the obtained properties of the panel rather than for reasons of protecting the coated surface against exposure to wear or corrosion.

Coated substrate sheets according to the invention preferably have a low solar factor of around 70% or less, more preferably at most 65%. In the case of multiple glazing, locating the coating on the outer face, i.e. towards the energy source, generally improves the solar factor over that achieved with the coating facing away from the energy source.

The Sb/Sn molar ratio in the coating layer is preferably at least 0.03, most preferably at least 0.05. This assists in ensuring a high level of absorption. On the other hand the said ratio is preferably less than 0.21, with a view to achieving a high level of luminous transmittance (TL). Most preferably the ratio is less than 0.16, since above this level the coating layer displays an unduly high level of absorption, coupled with poor selectivity.

It is desirable that the glazing panel shall transmit a reasonable proportion of visible light in order to allow both good natural illumination inwards into the building or vehicle and good visibility outwards. Thus it is desirable to increase the selectivity of the coating, i.e. to increase the ratio of the transmittance to the solar factor. Indeed it is preferred that the selectivity be as high as possible. The light transmission (TL) of a coated substrate according to the invention is typically in the range 35 to 76%, depending upon the specific additive employed.

Preferably, the modified tin oxide/antimony coating has a thickness of from 100 to 500 nm.

As mentioned above with reference to prior documents such as GB patent 2078213 one previously proposed constituent element in tin/antimony oxide coatings was fluorine, formed for example from reactants containing tin, antimony and fluorine in the ratios Sb/Sn=0.028, F/Sn=0.04. However we have discovered that the presence of fluorine tends to hinder the incorporation of antimony into the coating. For example reactants containing antimony and tin in the ratio Sb/Sn=0.028 gave a coating with an Sb/Sn ratio of about 0.057, whilst the same reactants plus a fluorine-containing reactant in an amount such that F/Sn=0.04 gave a coating with an Sb/Sn ratio of about 0.038. Fluorine is therefore specifically excluded from the coatings of the present invention.

Preferably, to ensure high optical quality, any haze in the product should be less than 2%. The possibility of reducing haze by using an undercoat Is discussed later in this description.

One preferred group of metals from which to select the additive comprises aluminium, chromium, cobalt, iron, manganese, magnesium, nickel, vanadium, and zinc. Using these additives permits the production of coatings presenting low levels of haze.

Another preferred group of metals from which to select the additive comprises aluminium, chromium, cobalt, iron, magnesium and zinc. These additives have the most favourable effect on the reflectance of the product.

Thus to form a coating having high reflectance and low haze, the additive is preferably selected from aluminium, chromium, cobalt, iron, magnesium, and zinc, more preferably from chromium, iron and magnesium. Chromium is most preferred: it permits the achievement of a product with high reflectance and very low haze, and which can have a neutral aspect in reflection.

As described and claimed in our copending patent application of is the same date as the present application, the reflectance of the coating may be further improved by the application of an outer reflective layer having a geometric thickness in the range 30 to 150 nm and a refractive index in the range 2.0 to 2.8.

Application of a pyrolytic coating to flat glass is best achieved when the glass is newly formed, e.g. as it leaves a float glass line. This provides economic benefits in avoiding the need to reheat the glass for the pyrolytic reactions to take place, and in the quality of the coating, since the newly formed glass surface is in pristine condition.

Preferably the source of tin is selected from one or both of $SnCl_4$ and monobutyl trichloro tin ("MBTC"). The source of antimony may be selected from one or more of $SbCl_5$, $SbCl_3$, organo antimony compounds such as $Sb(OCH_2CH_3)_8$, $Cl_{1.7}Sb(OCH_2CH_3)_{1.3}$, $Cl_2SbOCHClCH_3$, $Cl_6SbOCH_2CHCH_3Cl$ and $Cl_2SbOCH_2C(CH_3)_2Cl$. The source of the additive may similarly be a suitable chloride or organo-metallic compound of the respective element.

The sources of tin, antimony and additive are preferably formed into a single starting solution, described herein as the "reactant mixture", so as to be applied simultaneously to the substrate.

The reactant mixture may be applied to the substrate by chemical vapour deposition (CVD or "vapour pyrolysis") or as a liquid spray ("liquid pyrolysis"). Especially for liquid spray deposition, the proportions of tin, antimony and additive in the formed coating can differ significantly from those in the reactant mixture solution such that it is necessary to alter the relative concentrations of reactants to obtain layers with the desired proportions in the coating.

In the reactant mixture the proportion of tin is typically in the range 20 to 45% by weight and the proportion of antimony is typically in the range 0.5 to 2.5% by weight of the total mixture. The proportion of additive is preferably in the range 0.2 to 3.6% by weight, Because it may be difficult to establish the proportion of the additive in the finished coating the quantity of additive to be employed is determined at the stage of forming the reactant mixture.

To form the modified tin oxide/antimony coating by CVD, the substrate is brought into contact, in a coating chamber, with the reactant mixture comprising the sources of tin, antimony and additive. The reactant mixture is typically supplied through a first nozzle. Where this mixture comprises chlorides which are liquid at ambient temperature, it is vaporised in a heated current of anhydrous carrier gas such as nitrogen. Vaporisation is facilitated by the atomization of these reagents in the carrier gas. To produce the oxides, the chlorides are brought into the presence of water vapour conducted through a second nozzle.

Methods and devices for forming such a coating are described for example in French patent No 2348166 or in French patent application No 2 648 453 A1. These methods and devices lead to the formation of particularly strong coatings with advantageous optical properties.

To form the coating by a spray method, the substrate may be brought into contact with a spray of droplets containing the sources of tin, antimony and additive. The spray is applied by one or more spray nozzles arranged to follow a path which provides the coating across the width of the ribbon to be coated.

CVD offers benefits over sprayed liquids in providing coatings of regular thickness and composition, such uniformity of the coating being important where the product is to cover a large area. A spray coating also tends to retain traces of the sprayed droplets and of the path of the spray gun. Moreover, the pyrolysis of sprayed liquids is essentially limited to the manufacture of oxide coatings, such as $SnO_2$ and $TiO_2$. It is also difficult to make multi-layer coatings using sprayed liquids because every coating deposition produces a significant cooling of the substrate. Furthermore, CVD is more economic in terms of raw materials, leading to lower wastage.

However despite such disadvantages of the spray method it is nevertheless convenient and inexpensive to apply and employs simple equipment. It is thus often adopted, especially for formation of thick coating layers.

If desired an intermediate coating layer may be positioned between the substrate and the modified tin oxide/antimony coating layer, as an "undercoat" for the modified layer, to adjust the optical properties of the coating. For example, it has been found that in the pyrolytic deposition of a tin oxide coating from tin chloride on a soda-lime glass substrate, sodium chloride tends to become incorporated into the coating as a result of reaction of the glass with the coating precursor material or its reaction products, leading to haze in the coating. The presence of an undercoat can reduce or eliminate the haze. One effect of the undercoat layer is to inhibit the migration of sodium ions from a soda-lime glass substrate, whether by diffusion or otherwise into the modified tin oxide/antimony coating. Such diffusion may occur during formation of the coating or during a subsequent high temperature treatment.

We have also noted that for a tin oxide/antimony coating a selected undercoat layer can give a more neutral tint in reflection, which is widely considered to add to the aesthetic appeal of the coating.

In one embodiment of the invention the undercoat layer may be pyrolytically formed in an incompletely oxidized state by contacting the substrate in an undercoating chamber with undercoat precursor material in the presence of oxygen in insufficient quantity for full oxidation of the undercoat material on the substrate. The expression "incompletely oxidized material" is used herein to denote a true sub-oxide, that is to say an oxide of a lower valency state of a multivalent element (for example $VO_2$ or TiO), and also to denote an oxide material which contains oxygen gaps in its structure: an example of the latter material is $SiO_x$ where x is less than 2, which may have the general structure of $SiO_2$ but has a proportion of gaps which would be filled with oxygen in the dioxide.

A preferred example of the material for the undercoat layer is alumina with a small proportion of vanadium oxide. Such an alumina/vanadium material is described in GB 2248243. The preferred geometric thickness of an undercoat layer of this material is between 40 and 100 nm, for example about 80 nm.

If a glass substrate bearing an incompletely oxidised coating is exposed to an oxidizing atmosphere for a sufficiently long period of time, it may be expected that the coating will tend to become fully oxidized so that its desired properties are lost. Therefore, such undercoat is over-coated with the modified tin oxide/antimony coating layer while it is still in an incompletely oxidized state, and while the substrate is still hot, thereby to pressure such undercoat in an incompletely oxidized state. The time during which the freshly undercoated glass substrate may be exposed to an oxidizing atmosphere such as air and before the undercoat is over-coated, without damaging the properties of the undercoat, will depend on the temperature of the glass during such exposure and on the nature of the undercoat.

Advantageously, said undercoating chamber is surrounded by a reducing atmosphere. This assists in preventing ambient oxygen from entering the chamber and accordingly allows better control of the oxidizing conditions. The oxygen required for the undercoating reaction need not be pure oxygen and can accordingly be supplied from a controlled source of air.

Glazing panels incorporating coated substrates according to the invention may be manufactured as follows. Each pyrolytic coating step may be carried out at a temperature of at least 400° C., ideally from 550° C. to 750° C. The coatings can be formed on a sheet of glass which moves in a tunnel oven or on a glass ribbon during formation, whilst it is still hot. The coatings can be formed inside the lehr which follows the glass ribbon forming device or inside the float tank on the top face of the glass ribbon whilst the latter is floating on a bath of molten tin.

The invention will now be described in more detail, with reference to the following non-limiting examples.

In the Examples the Sb/Sn molar ratio in the coating layers was determined by an X-ray analysis technique in which the number of X-ray counts of the respective elements was compared. While this technique is not as precise as if a calibration by chemical dosage were made, the similarity of antimony and tin means that they respond similarly to X-rays. The ratio of the measured number of observed counts of the respective elements thus provides a close approximation to their molar ratio.

The initials in the headings in the accompanying tables (TL, TE etc.) have the meanings described above.

EXAMPLES 1 TO 13

A coating was applied to clear soda-lime float glass of 6 mm thickness at a coating station located at a position in a float chamber where the glass was at a temperature in excess of 550° C. A reactant mixture solution comprising, monobutyl trichloro tin ("MBTC"), $Cl_{1.7}Sb(OCH_2C_3)_{1.3}$, a chromium precursor and 4% by weight of a stabiliser methyl-isobutyl ketone $C_4H_9COCH_3$ was sprayed on to the glass through a reciprocating spray head to form a coating comprising an oxidised mixture of tin, antimony and chromium. The proportions of Sn, Sb and Cr in the solution were respectively 37.35%, 0.783% and 0.5% by weight, i.e. a Sb/Sn ratio in the solution of 0.02. The accompanying Table 1 shows the thickness of the resultant coated substrate and its Sb/Sn ratio, together with its reflectance and other optical properties.

For the other examples, the procedure of Example 1 was followed but with variations in the choice of additive and its proportion in the reactant mixture as shown in Table 2 below. The proportions of the respective components were percentages by weight of the whole mixture.

It should be borne in mind that comparisons of the respective reflectance values between different examples can only be made for similar thicknesses and Sb/Sn ratios because these parameters are of great importance for the reflectance value. For example, two coatings of the same composition will show differences in reflectance as a function of their thickness.

Examples 1 to 4 show that chromium as the additive gives a coating with low haze and with increased reflectance. Haze is sometimes present but is very low if an $SiO_2$ undercoat is deposited between the glass and coating (see example 4).

Examples with Fe and examples with Mg as the additive show high reflectance values.

These examples presented good reflectance but high haze, even with an undercoat.

EXAMPLES 17 TO 27

An undercoat was applied to clear soda-lime float glass of 6 mm thickness at a coating station located at a position in a float chamber where the glass was at a temperature in excess of 550° C. A solution in glacial acetic acid of 220 g/l aluminum acetylacetonate and 12 g/l vanadium triacetylacetonate was sprayed on to the glass through a reciprocating

TABLE 1

| Example | Additive element | Additive in solution % | TL % | RL % | TE % | FS % | TL/FS | TL/TE | Haze (Haze with undercoat) | Thickness nm | [Sb]/[Sn] |
|---|---|---|---|---|---|---|---|---|---|---|---|
| 1 | Cr | 0.5 | 69 | 15.7 | 58 | 65 | 1.06 | 1.19 | 1.5 | 368 | 0.05 |
| 2 | Cr | 1 | 67 | 16.5 | 61 | 67 | 1.00 | 1.10 | 3 | 364 | 0.05 |
| 3 | Cr | 2 | 61 | 16 | 60 | 66 | 0.92 | 1.02 | 1 | 319 | 0.06 |
| 4 | Cr | 1 | 53 | 17 | 43 | 54 | 0.98 | 1.23 | 1.6 (0.26) | 392 | 0.12 |
| 5 | Fe | 0.5 | 69 | 17 | 62 | 68 | 1.01 | 1.11 | 1.5 | 310 | 0.17 |
| 6 | Fe | 1 | 53 | 11 | 42 | 54 | 0.98 | 1.26 | 1.5 | 345 | 0.17 |
| 7 | Fe | 2.4 | 62 | 20 | 58 | 64 | 0.97 | 1.07 | 6.7 | 331 | 0.21 |
| 8 | Mg | 0.5 | 69 | 14 | 59 | 67 | 1.03 | 1.17 | 3.5 | 337 | 0.09 |
| 9 | Zn | 1 | 53 | 15 | 46 | 57 | 0.93 | 1.15 | 1.3 | 307 | 0.09 |
| 10 | Al | 0.9 | 55 | 14 | 48 | 58 | 0.95 | 1.15 | 1.2 | 323 | 0.22 |
| 11 | Co | 3.55 | 48 | 14 | 40 | 52 | 0.92 | 1.20 | 6.4 (1.27) | 307 | 0.24 |
| 12 | Mn | 0.5 | 46 | 10 | 37 | 51 | 0.90 | 1.24 | 1.6 | 331 | 0.17 |
| 13 | Ni | 0.35* | 39 | 10 | 36 | 49 | 0.80 | 1.08 | 0.47 | 241 | 0.20 |
| 14 | V | 5 | 49 | 11 | 41 | 53 | 0.92 | 1.20 | 0.68 | 329 | 0.24 |
| 15 | Zr | 2 | 58 | 12 | 44 | 55 | 1.05 | 1.32 | 6.5 | 389 | 0.06 |
| 16 | Zr | 2 | 44 | 11 | 32 | 47 | 0.94 | 1.38 | 20.5 (12.4) | 573 | 0.06 |
| Comp1 | Sb alone | 0.07 | 34 | 10 | 32 | 46 | 0.74 | 1.06 | 0.54 | 337 | 0.21 |
| Comp2 | Sb alone | 0.02 | 71 | 12 | 57 | 65 | 1.09 | 1.25 | 0.4 | 264 | 0.06 |
| Comp3 | Sb alone | 0.04 | 41 | 12 | 32 | 47 | 0.87 | 1.28 | 0.78 | 350 | 0.11 |

*Solution further contains 0.1% Ti to improve the nickel compound stability

TABLE 2

| Example | Metal Content | Sn content (%) by weight | Sb content % by weight | Sb/Sn |
|---|---|---|---|---|
| 1 | 0.5% Cr | 37.35 | 0.747 | 0.02 |
| 2 | 1.0% Cr | 35.55 | 0.711 | 0.02 |
| 3 | 2.0% Cr | 32 | 0.640 | 0.02 |
| 4 | 1.0% Cr | 35.58 | 1.423 | 0.04 |
| 5 | 0.5% Fe | 36.23 | 2.53 | 0.07 |
| 6 | 1.0% Fe | 34.57 | 2.42 | 0.07 |
| 7 | 2.4% Fe | 31.14 | 2.18 | 0.07 |
| 8 | 0.5% Mg | 35.31 | 2.47 | 0.07 |
| 9 | 1.0% Zn | 35.69 | 2.50 | 0.07 |
| 10 | 0.90% Al | 32.29 | 2.26 | 0.07 |
| 11 | 3.55% Co | 31.14 | 2.18 | 0.07 |
| 12 | 0.5% Mn | 36.06 | 2.52 | 0.07 |
| 13 | 0.35% Ni | 36.60 | 2.56 | 0.07 |

EXAMPLE 14

A reactant mixture solution comprising monobutyl trichloro tin ("MBTC"), $SbCl_3$, a vanadium precursor (vanadium triacetylacetonate) and 4% by weight of a stabilizer (methylisobutyl ketone $C_4H_9COCH_3$) was sprayed on to the glass through a reciprocating spray head to form a coating comprising an oxidised mixture of tin, antimony and vanadium. The Sb/Sn ratio in the solution was 0.07. The reflectance value obtained for this example was low.

EXAMPLES 15 AND 16

The procedure of Example 1 was followed but with variations in the choice of additive and its proportion in the reactant mixture. The additive is zirconium.

spray head to form an undercoat of about 80 nm thickness and comprising an oxidised mixture of aluminium and vanadium.

The undercoated glass substrate was passed to a second coating station at which a reactant mixture solution comprising, monobutyl trichloro tin ("MBTC"), $Cl_{1.2}Sb(OCH_2CH_3)_{1.3}$ and an additive precursor was sprayed on to the glass through a reciprocating spray head to form a coating comprising an oxidised mixture of tin, antimony and aluminium. The proportions of additive and the Sb/Sn ratio in the solution were as mentioned in the accompanying Table 3, which also shows the thickness of the resultant coated substrate and its Sb/Sn ratio, together with its reflectance and other optical properties.

EXAMPLES 28 TO 33

Coated glass substrates prepared as in Examples 17 and 18 were formed into double glazing panels comprising the coated substrate and a similar but uncoated soda-lime glass sheet.

The reflectance and other optical properties of the so-formed panels are shown in the accompanying Table 4. The position of the coating is indicated by the designations P1, P2 or P3, in which P1 represents the outward facing surface of the external sheet P2 represents the inward facing surface of the external sheet and P3 represents the outward facing surface of the internal sheet. The results of Examples 17 and 18 (with a monolithic sheet) are repeated in Table 3 for ease of comparison with the double glazed panels.

TABLE 3

| Example | Additive | Additive in solution % | Sb/Sn in solution | TL % | $\lambda_D$ nm | Purity (TL) % | RL (CS) % | $\lambda_D$ nm | Purity (RL) % | TE % | FS % | TL/TE | TL/FS | Haze % | Sb/Sn | Thickness nm |
|---|---|---|---|---|---|---|---|---|---|---|---|---|---|---|---|---|
| 17 | Cr | 0.5 | 0.02 | 75.9 | 552 | 1.6 | 13 | 600 | 2.6 | 64.8 | 71.2 | 1.17 | 1.07 | 0.29 | 0.06 | 240 |
| 18 | Cr | 0.5 | 0.04 | 61.7 | 488 | 2.3 | 13.1 | 576 | 10 | 53.2 | 62.1 | 1.16 | 0.99 | 0.18 | 0.15 | 220 |
| 19 | Cr | 0.5 | 0.04 | 65 | 486 | 2.7 | 13.7 | 565 | 5.4 | 55.6 | 64.6 | 1.17 | 1.01 | 0.2 | 0.13 | 190 |
| 20 | Cr | 2 | 0.07 | 70 | 571 | 8.8 | 11.1 | −566 | 15.7 | 61.6 | 68.7 | 1.14 | 1.02 | 1.47 | 0.15 | 240 |
| 21 | Mg | 0.5 | 0.07 | 74.3 | 569 | 2.5 | 14.1 | 574 | 7.4 | 67.4 | 73 | 1.10 | 1.02 | 1.04 | 0.10 | 220 |
| 22 | Fe | 0.5 | 0.07 | 68.8 | 568 | 8.8 | 14.3 | −544 | 12.3 | 61.1 | 68.3 | 1.13 | 1.01 | 1.87 | 0.20 | 320 |
| 23 | Fe | 2.4 | 0.07 | 74.5 | 571 | 11.3 | 12.9 | −567 | 18.5 | 66.6 | 71.9 | 1.12 | 1.04 | 0.59 | 0.23 | 240 |
| 24 | Fe | 1 | 0.07 | 64.4 | 543 | 2 | 11.9 | −531 | 9.5 | 53.1 | 62.6 | 1.21 | 1.03 | 0.73 | 0.23 | 240 |
| 25 | Al | 0.9 | 0.07 | 66.6 | 570 | 6.8 | 11.1 | −567 | 12.9 | 60 | 67.6 | 1.11 | 0.99 | 0.31 | 0.32 | 220 |
| 26 | Zn | 1 | 0.07 | 67.7 | 556 | 3.4 | 12.7 | −555 | 12.3 | 57.2 | 65.5 | 1.18 | 1.03 | 1.38 | 0.24 | 250 |
| 27 | Mn | 0.5 | 0.07 | 51.9 | 484 | 6 | 10.1 | −552 | 5.1 | 41.1 | 54.2 | 1.26 | 0.96 | 1.13 | 0.17 | 340 |
| Comp | Sb alone | 0 | 0.07 | 29.6 | 476 | 11.9 | 9.6 | −500 | 4 | 32.5 | 47.9 | 0.91 | 0.62 | 0.55 | 0.24 | 240 |

TABLE 4

| Example | Position | TL % | $\lambda_D$ nm | Purity (TL) % | RL (CS) % | $\lambda_D$ nm | Purity (RL) % | TE % | FS % | TL/TE | TL/FS | Haze % | Sb/Sn | Thickness nm |
|---|---|---|---|---|---|---|---|---|---|---|---|---|---|---|
| 17 | monolit. | 75.9 | 552 | 1.6 | 13 | 600 | 2.6 | 64.8 | 71.2 | 1.17 | 1.07 | 0.29 | 0.06 | 240 |
| 28 | P1 | 69.6 | 552 | 1.9 | 17.8 | 584 | 2.4 | 58.1 | 63.6 | 1.20 | 1.09 | | | |
| 29 | P2 | 69.6 | 551 | 1.8 | 17.1 | 575 | 7.1 | 58.1 | 63.8 | 1.20 | 1.09 | | | |
| 30 | P3 | 69.6 | 551 | 1.8 | 18.6 | 585 | 1.3 | 58.1 | 70.7 | 1.20 | 0.98 | | | |
| 18 | monolit. | 61.7 | 488 | 2.3 | 13.1 | 576 | 10 | 53.2 | 62.1 | 1.16 | 0.99 | 0.18 | 0.15 | 220 |
| 31 | P1 | 56.5 | 490 | 2.3 | 16.3 | 575 | 6.9 | 47.7 | 54.2 | 1.18 | 1.04 | | | |
| 32 | P2 | 56.7 | 490 | 2.2 | 14.1 | 558 | 6.7 | 47.8 | 54.4 | 1.19 | 1.04 | | | |
| 33 | P3 | 56.7 | 490 | 2.2 | 18.7 | 573 | 5.4 | 47.8 | 67.3 | 1.19 | 0.84 | | | |

CS = coated side

What is claimed is:

1. A coated transparent substrate, comprising:
   a transparent substrate; and
   a pyrolytically-formed coating layer which is carried by the transparent substrate, which is formed by pyrolysis of at least one precursor, which contains tin oxide and antimony oxide in a Sb/Sn molar ratio range from 0.03 to 0.16 and an additive comprised of at least one element selected from the group consisting of aluminum, chromium, cobalt, iron, manganese, magnesium, nickel, vanadium, zinc and zirconium, and which is free from fluorine so that the coated transparent substrate has a reflectance (RL) of at least 10%.

2. The coated transparent substrate as claimed in claim 1, wherein the reflectance (RL) is at least 13%.

3. The coated transparent substrate as claimed in claim 1, wherein the pyrolytically-formed coating layer has a thickness ranging from 100 to 500 nm.

4. The coated transparent substrate as claimed in claim 1, which further comprises an undercoat layer which is positioned between the transparent substrate and the pyrolytically-formed coating layer.

5. The coated transparent substrate as claimed in claim 4, wherein the undercoat layer has a geometric thickness ranging from 40 and 100 nm.

6. The coated transparent substrate as claimed in claim 4, wherein the undercoat layer gives to the pyrolytically-formed coating a tint in reflection which is more neutral than would be obtained without the undercoat.

7. The coated transparent substrate as claimed in claim 1, having a solar factor (FS) which is at most 70%.

8. The coated transparent substrate as claimed in claim 1, having a luminous transmittance (TL) ranging between 35 and 76%.

9. A glazing panel, comprising a coated transparent substrate as claimed in claim 1.

10. The glazing panel as claimed in claim 9, comprising:
    at least two substrate sheets of which one is a coated transparent substrate as claimed in claim 1.

11. The glazing panel as claimed in claim 9, which has a structure of a glazing panel for a building.

12. The glazing panel as claimed in claim 9, which has a structure of a window for a vehicle.

13. The glazing panel as claimed in claim 9, which has a structure which is one of a building glazing panel for a building or a vehicle window for a vehicle, and wherein the coated transparent substrate is located to face the exterior of the building or vehicle.

14. The glazing panel as claimed in claim 10, wherein the coated transparent substrate forms the outer sheet of the at least two substrate sheets, and wherein the pyrolytically-formed coating layer forms an outer face of the outer sheet.

15. A method of forming a transparent coated substrate, comprising:
    providing a reactant mixture; and
    pyrolytically depositing a coating layer onto a transparent substrate from the reactant mixture, the coating layer containing oxides of tin and antimony in a Sb/Sn molar ratio ranging from 0.03 to 0.16,
    wherein the reactant mixture comprises precursors for tin oxide and antimony oxide, and further comprises an additive comprising at least one element selected from the group consisting of aluminum, chromium, cobalt, iron, manganese, magnesium, nickel, vanadium, zinc and zirconium, and which is free from fluorine so that the transparent coated substrate has a reflectance (RL) of at least 10%.

16. The method as claimed in claim 15, wherein pyrolytic deposition is accomplished by chemical vapor deposition (CVD).

17. The method as claimed in claim 15, further comprising providing an undercoat layer on the transparent substrate prior to pyrolytically depositing the coating layer.

18. The method as claimed in claim 17, wherein the undercoat layer is provided by pyrolytic deposition in an incompletely oxidized state by contacting the transparent substrate in an undercoating chamber with undercoat precursor material in the presence of oxygen in insufficient quantity for full oxidation of the undercoat precursor material on the transparent substrate.

19. The method as claimed in claim 17, wherein the undercoat layer has a geometric thickness ranging between 40 and 100 nm.

20. The coated transparent substrate as claimed in claim 7, wherein the coated transparent substrate has a solar factor (FS) which is at most 65%.

21. A coated transparent substrate having a reflectance (RL) of at least 10% comprising:
   a transparent substrate; and
   a pyrolytically formed coating layer which is carried by the transparent substrate, which is free from fluorine, and which is formed by pyrolysis of at least one precursor, which contains tin oxide and antimony oxide in a Sb/Sn molar ratio ranging from 0.01 to 0.5, and which contains an additive comprised of at least one element selected from the group consisting of aluminum, chromium, cobalt, iron, manganese, magnesium, nickel, vanadium, zinc and zirconium, and one of the following (a) or (b);
   (a) the pyrolytically formed coating layer has a thickness of from 100 to 500 nm;
   (b) an undercoat layer which is carried by the substrate layer.

22. The coated transparent substrate as claimed in claim 21 and including both (a) and (b).

23. The coated transparent substrate as claimed in claim 21, and further including at least one of the features (c) through (k):
   (c) the Sb/Sn molar ratio ranges from 0.03 to 0.21;
   (d) the additive is selected from the group consisting of chromium, iron and magnesium;
   (e) the reflectance (RL) is at least 13%;
   (f) the pyrolytically formed coating layer has a thickness ranging from 220 to 500 nm;
   (g) the undercoat layer, if present, comprises alumina with a small proportion of vanadium oxide;
   (h) the undercoat layer, if present, has a geometric thickness ranging from 40 to 100 nm;
   (i) the undercoat layer, if present, gives to the pyrolytically formed coating a tint in reflection which is more neutral than would be obtained without the undercoat;
   (j) the coated transparent substrate has a solar factor (FS) which is at most 70%;
   (k) the coated transparent substrate has a luminous transmittance (TL) ranging between 35 and 76%.

24. The coated transparent substrate as claimed in claim 23, and further including at least two of the features (c) through (k).

25. The coated transparent substrate as claimed in claim 23, and further including all of the features (c) through (k).

26. The coated transparent substrate as claimed in claim 21 wherein the Sb/Sn molar ratio ranges from 0.03 to 0.16.

27. The coated transparent substrate as claimed in claim 21, having a solar factor (FS) which is at most 65%.

28. The coated substrate as claimed in claim 21, wherein the pyrolytically formed coating layer consists essentially of tin oxide and antimony oxide and the additive.

29. The coated transparent substrate as claimed in claim 21, wherein the pyrolytically formed coating layer consists of tin oxide and antimony oxide and the additive.

30. A glazing panel, comprising a coated transparent substrate as claimed in claim 21.

31. The glazing panel comprising at least two substrate sheets of which one is a coated transparent substrate as claimed in claim 21.

32. The glazing panel as claimed in claim 31, which has a structure of a glazing panel for a building.

33. The glazing panel as claimed in claim 31, which has a structure of a window for a vehicle.

34. The glazing panel as claimed in claim 31, which has a structure which is one of a building glazing panel for a building or a vehicle window for a vehicle, and wherein the coated transparent substrate is located to face the exterior of the building or vehicle.

35. The glazing panel as claimed in claim 32, wherein the coated transparent substrate forms the outer sheet of the at least two substrate sheets, and wherein the pyrolytically formed coating layer forms an outer face of the outer sheet.

36. A method of forming a transparent coated substrate having a reflectance (RL) of at least 10%, comprising:
   providing a reactant mixture; and
   pyrolytically depositing by chemical vapor deposition (CVD) a coating layer which is free from fluorine onto the transparent substrate from the reactant mixture, the coating layer containing oxides of tin and antimony in a Sb/Sn molar ratio ranging from 0.01 to 0.5, wherein the reactant mixture comprises precursors for tin oxide and antimony oxide, and further comprises an additive comprising at least one element selected from the group consisting of aluminum, chromium, cobalt, iron, manganese, magnesium, nickel, vanadium, zinc and zirconium which is present in the reactant mixture within the range 0.2–3.6% by weight.

37. The method of claim 36 further including at least one of the following (a) through (d):
   (a) the pyrolytically formed coating layer is deposited at a temperature which ranges from 550° C. to 750° C.;
   (b) the transparent substrate is one of a sheet of hot glass positioned within a tunnel oven or a ribbon of hot glass during formation thereof;
   (c) providing an undercoat layer on the transparent substrate prior to pyrolytically depositing the coating layer;
   (d) the coating layer has a thickness of from 100 to 500 nm.

38. The method of claim 37, and further including all of the features (a) through (d).

39. The method of claim 37 wherein, the undercoat layer, if present, is provided by pyrolitic deposition in an incompletely oxidized state by contacting the transparent substrate in an undercoating chamber with undercoat precursor material in the presence of oxygen in insufficient quantity for fall oxidation of the undercoat precursor material on the transparent substrate.

* * * * *